(12) United States Patent
Saito et al.

(10) Patent No.: US 9,275,354 B2
(45) Date of Patent: Mar. 1, 2016

(54) POWER MANAGEMENT DEVICE, POWER MANAGEMENT METHOD, AND DEMAND NOTIFYING DEVICE

(71) Applicant: Sony Corporation, Tokyo (JP)

(72) Inventors: Junko Saito, Kanagawa (JP); Taro Tadano, Chiba (JP); Ryoki Honjo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 490 days.

(21) Appl. No.: 13/667,939

(22) Filed: Nov. 2, 2012

(65) Prior Publication Data

US 2013/0123995 A1 May 16, 2013

(30) Foreign Application Priority Data

Nov. 10, 2011 (JP) ................................. 2011-246793

(51) Int. Cl.
G05D 23/19 (2006.01)
G06Q 10/04 (2012.01)
G06Q 50/06 (2012.01)

(52) U.S. Cl.
CPC ............... *G06Q 10/04* (2013.01); *G06Q 50/06* (2013.01)

(58) Field of Classification Search
CPC ................................ G06Q 10/04; G06Q 50/06
USPC ................. 700/286, 291, 295, 296; 705/14.1, 705/14.19, 14.2, 412
See application file for complete search history.

(56) References Cited

U.S. PATENT DOCUMENTS

| | | | | |
|---|---|---|---|---|
| 6,732,019 B2* | 5/2004 | Spool et al. | .................... | 700/291 |
| 6,778,882 B2* | 8/2004 | Spool et al. | .................... | 700/295 |
| 8,068,938 B2* | 11/2011 | Fujita | ............................. | 700/295 |
| 8,400,661 B2* | 3/2013 | Grasso et al. | ................ | 358/1.15 |
| 2010/0076825 A1* | 3/2010 | Sato et al. | ..................... | 705/14.1 |
| 2010/0292856 A1* | 11/2010 | Fujita | ............................. | 700/291 |
| 2011/0022242 A1* | 1/2011 | Bukhin et al. | ................ | 700/291 |
| 2011/0137763 A1* | 6/2011 | Aguilar | ........................... | 705/30 |
| 2012/0185304 A1* | 7/2012 | Belady et al. | ................ | 705/14.1 |
| 2012/0265586 A1* | 10/2012 | Mammone | ................... | 705/14.1 |
| 2012/0271686 A1* | 10/2012 | Silverman | .................... | 705/14.1 |
| 2013/0079938 A1* | 3/2013 | Lee et al. | ...................... | 700/291 |

FOREIGN PATENT DOCUMENTS

JP 05-018995 A 1/1993

* cited by examiner

*Primary Examiner* — Charles Kasenge
(74) *Attorney, Agent, or Firm* — Hazuki International, LLC

(57) ABSTRACT

A power management device includes a power demand predicting section, demand control section, demand issuing section, and acceptance receiving section. The power demand predicting section calculates a first predicted amount of power demand, representing a result of prediction of power demand of a power consumer on a date and time in a future, and a second predicted amount of power demand, being calculated after the first predicted amount of power demand, and represents a result of prediction of power demand of the consumer on the date and time in the future. The demand control section determines a demand for prompting the consumer to adjust the amount of power demand based on the first and the second predicted amounts of power demand. The demand issuing section issues the demand determined by the demand control section to the consumer. The acceptance receiving section receives acceptance of the issued demand by the consumer.

14 Claims, 8 Drawing Sheets

FIG. 4

| DEMAND TYPE | EXECUTION RATE | RANKING |
|---|---|---|
| TURN OFF ONE LIGHT | 90% | 1 |
| TURN OFF TV | 80% | 2 |
| DISCOUNT COUPON OF RESTAURANT B | 60% | 3 |
| DISCOUNT COUPON OF RESTAURANT A | 57% | 4 |
| NOTIFICATION OF EVENT B | 40% | 5 |
| SET AIR CONDITIONER TO LOWER TEMPERATURE | 32% | 6 |
| DISCOUNT COUPON OF DEPARTMENT STORE B | 20% | 7 |
| DISCOUNT COUPON OF DEPARTMENT STORE A | 12% | 8 |
| TURN OFF PERSONAL COMPUTER | 11% | 9 |
| NOTIFICATION OF EVENT A | 5% | 10 |
| ⋮ | | |

FIG.6A

DEMAND CAN BE MET BY CONTROLLING USE OF FOLLOWING APPLIANCES.
SELECT APPLIANCE.

☐ TELEVISION SET

☐ DRYER

☑ AIR CONDITIONER

DO YOU ACCEPT DEMAND?
(YES) (NO) (PENDING)

FIG.6B

DEMAND CAN BE MET BY SELECTING FOLLOWING ACTION.
SELECT ACTION.

☐ TURN OFF POWER TO TV

☐ GO TO EVENT IN FRONT OF STATION

☑ USE COUPON AT ** RESTAURANT

DO YOU ACCEPT DEMAND?
(YES) (NO) (PENDING)

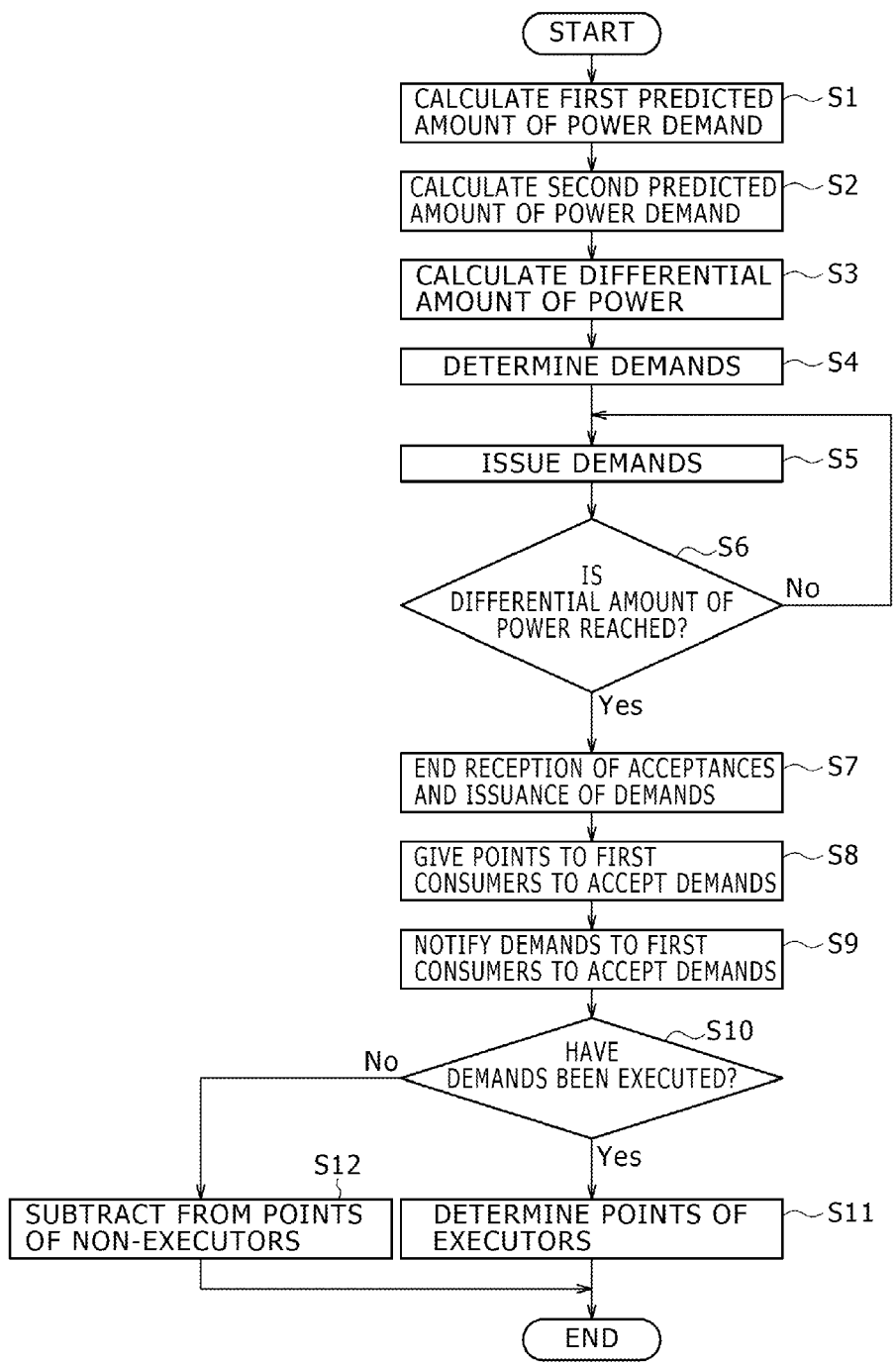

POWER MANAGEMENT DEVICE, POWER MANAGEMENT METHOD, AND DEMAND NOTIFYING DEVICE

BACKGROUND

The present technology relates to a power management device, a power management method, and a demand notifying device.

In the past, power supply to power consumers in many countries has been monopolized by power companies. However, the entries of entities other than power companies into a power retailing business and power futures trading have recently been realized or promoted with an objective of further improving efficiency of the electric power industry and supplying power at lower prices by introducing principles of competition into the electric power industry.

Power futures trading for example predicts a necessary amount of power in advance and sells or buys power for a following day or up to 24 hours ahead through a power market. Thus, in order for entities engaged in power retailing and power futures trading to have an advantage in power trading and make large profits, power demand needs to be predicted accurately.

As technology for predicting power demand, a total power demand amount predicting device has been proposed which predicts a total amount of power demand by taking in meteorological variables including an air temperature and humidity in the past and data on a total amount of power demand and further performing learning by a neural network (Japanese Patent Laid-Open No. Hei 5-18995 referred to as Patent Document 1 hereinafter).

SUMMARY

The total power demand amount predicting device described in Patent Document 1 predicts power demand on the basis of past meteorological data and the data on the total amount of power demand. Power demand is highly related to meteorological data on an average air temperature, humidity, and the like. Therefore a certain degree of power demand prediction can be performed by using the meteorological data.

However, actual weather may greatly differ from the prediction. Thus, when power demand is predicted on the basis of the meteorological data or the like, there may occur a large difference between a result of the demand prediction and an actual amount of power consumption.

The present technology has been made in view of such problems. It is desirable to provide a power management device, a power management method, and a demand notifying device for performing power management such that an actual amount of power demand approaches a predicted amount of power demand which amount is obtained in advance.

According to an embodiment of the present technology, there is provided a power management device including: a power demand predicting section configured to calculate a first predicted amount of power demand, the first predicted amount of power demand representing a result of prediction of power demand of a power consumer on a date and time in a future, and a second predicted amount of power demand, the second predicted amount of power demand being calculated after the first predicted amount of power demand, and represent a result of prediction of power demand of the power consumer on the date and time in the future; a demand control section configured to determine a demand for prompting the power consumer to adjust the amount of power demand on a basis of the first predicted amount of power demand and the second predicted amount of power demand; a demand issuing section configured to issue the demand determined by the demand control section to the power consumer; and an acceptance receiving section configured to receive acceptance of the issued demand by the power consumer.

In addition, according to another embodiment of the present technology, there is provided a power management method including: calculating a first predicted amount of power demand, the first predicted amount of power demand representing a result of prediction of power demand of a power consumer on a date and time in a future, and a second predicted amount of power demand, the second predicted amount of power demand being calculated after the first predicted amount of power demand, and representing a result of prediction of power demand of the power consumer on the date and time in the future; determining a demand for prompting the power consumer to adjust the amount of power demand on a basis of the first predicted amount of power demand and the second predicted amount of power demand; issuing the determined demand to the power consumer; and receiving acceptance of the issued demand by the power consumer.

In addition, according to further embodiment of the present technology, there is provided a demand notifying device including a communicating section configured to receive a demand transmitted from a power management device. The power management device has a power demand predicting section configured to calculate a first predicted amount of power demand, the first predicted amount of power demand representing a result of prediction of power demand of a power consumer on a date and time in a future, and a second predicted amount of power demand, the second predicted amount of power demand being calculated after the first predicted amount of power demand, and represent a result of prediction of power demand of the power consumer on the date and time in the future, a demand control section configured to determine the demand for prompting the power consumer to adjust the amount of power demand on a basis of the first predicted amount of power demand and the second predicted amount of power demand, a demand issuing section configured to issue the demand determined by the demand control section to the power consumer, and an acceptance receiving section configured to receive acceptance of the issued demand by the power consumer. The demand notifying device also includes a notifying section configured to notify the demand to the power consumer.

In addition, according to still further embodiment of the present technology, there is provided a power management device including: a demand control section configured to determine a demand for prompting a power consumer to adjust an amount of power demand on a basis of a first predicted amount of power demand, the first predicted amount of power demand representing a result of prediction of power demand of a power consumer on a date and time in a future, and a second predicted amount of power demand, the second predicted amount of power demand being calculated after the first predicted amount of power demand, and represent a result of prediction of power demand of the power consumer on the date and time in the future; a demand issuing section configured to issue the demand determined by the demand control section to the power consumer; and an acceptance receiving section configured to receive acceptance of the issued demand by the power consumer.

In addition, according to an embodiment of the present technology, there is provided a power management method including: determining a demand for prompting a power consumer to adjust an amount of power demand on a basis of a first predicted amount of power demand, the first predicted amount of power demand representing a result of prediction of power demand of a power consumer on a date and time in a future, and a second predicted amount of power demand, the second predicted amount of power demand being calculated after the first predicted amount of power demand, and representing a result of prediction of power demand of the power consumer on the date and time in the future; issuing the determined demand to the power consumer; and receiving acceptance of the issued demand by the power consumer.

Further, according to according to an embodiment of the present technology, there is provided a demand notifying device including a communicating section configured to receive a demand transmitted from a power management device. The power management device has a demand control section configured to determine a demand for prompting a power consumer to adjust an amount of power demand on a basis of a first predicted amount of power demand, the first predicted amount of power demand representing a result of prediction of power demand of a power consumer on a date and time in a future, and a second predicted amount of power demand, the second predicted amount of power demand being calculated after the first predicted amount of power demand, and represent a result of prediction of power demand of the power consumer on the date and time in the future, a demand issuing section configured to issue the demand determined by the demand control section to the power consumer, and an acceptance receiving section configured to receive acceptance of the issued demand by the power consumer. The demand notifying device also includes a notifying section configured to notify the demand to the power consumer.

According to the present technology, an amount of power demand by a power consumer can be adjusted according to an amount predicted in advance.

BRIEF DESCRIPTION OF THE DRAWINGS

FIG. 4 is a diagram showing information stored in a demand database;

FIGS. 6A and 6B are diagrams showing examples of a method of presenting issued demands;

FIG. 8 is a flowchart showing a flow of a process of power management by demands and a process of giving points.

DETAILED DESCRIPTION OF THE PREFERRED EMBODIMENTS

Figure 1:
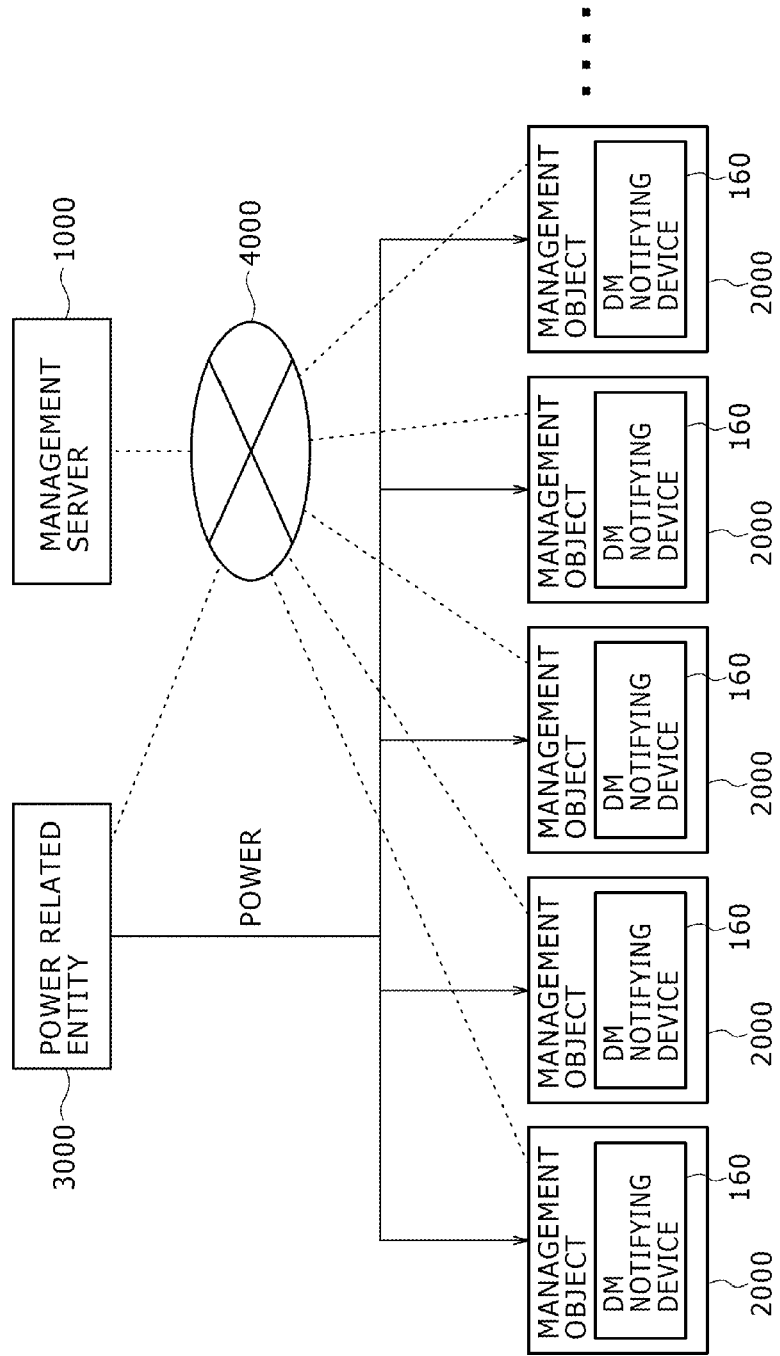
FIG. 1 is a block diagram showing outlines of a HEMS system including a power management device.

Preferred embodiments of the present technology will hereinafter be described with reference to the drawings. However, the present technology is not limited exclusively to the following examples. Incidentally, description will be made in the following order.

<1. Embodiment>
[1-1. Outlines of Power Trading]
[1-2. Outlines of HEMS System Including Power Management Device]
[1-3. Outlines of Power Management by Demands]
[1-4. Configuration of Power Management Device]
[1-5. Process of Power Management by Demands and Process of Giving Points]
<2. Examples of Modification>

1. Embodiment 1-1. Outlines of Power Trading

A power management device according to an embodiment of the present technology is used when power is procured in so-called power trading in which power to be delivered is traded in advance. Accordingly, description will first be made of outlines of the power trading. The power trading includes spot trading (spot market) where power to be used on a next day or two days later, for example, is traded and hour-ahead trading (hour-ahead market) where power to be used a few hours later on the designated day is traded. The power management device according to the embodiment of the present technology is used when power is procured by spot trading.

Spot trading is for example performed by the following system. Power to be delivered two days later is an object for trading. Thus, a trading object day is two days after the day of trading. However, the trading object day is not limited to two days after the day of trading, but power to be delivered on a next day may be the trading object.

One day is divided into 48 segments by dividing the day in units of 30 minutes. Trading is performed for the 48 products. Bidding for power for a next day is performed between 8 a.m. and 9:30 a.m. every morning, and the trading is concluded at 9:30 a.m. Incidentally, on Friday, power to be delivered a next day (Saturday), two days later (Sunday), and three days later (Monday) is traded.

The bidding is performed by indicating a price and a quantity. Trading and delivery are made with 1000 kw as a unit, for example. A price per kwh is in units of one sen. For example, when a contract is concluded for 600 kwh at 7 yen 48 sen/kwh for time segments of 13:00 to 14:00, the trading price is "600 kwh×7 yen 48 sen/kwh=8976 yen." When a contract is concluded for 600 kwh at 7 yen 48 sen/kwh for a time segment of 13:00 to 13:30, the trading price is "600 kwh×7 yen 48 sen/kwh=4488 yen."

Incidentally, when power procured by spot trading is insufficient on the trading object day, power is procured by performing power trading in real time on the trading object day. The price for power on the designated trading object day is usually higher than that in spot trading. It is therefore desirable not to trade power on the designated trading object day if possible.

1-2. Outlines of HEMS System Including Power Management Device

Description will next be made of outlines of a HEMS system including the power management device according to the embodiment of the present technology. The power management device is used in the HEMS (home energy management system) system. The HEMS is a system for achieving energy saving by making efficient use of energy in ordinary households or the like using IT technology and the like.

Outlines of the HEMS system to which the power management device is applied will be described with reference to FIG. 1. FIG. 1 shows relation between a management server 1000 for performing power management, the management server 1000 including functions of the power management device, a plurality of management objects 2000, and a power-related entity 3000.

The management objects 2000 are houses, condominiums, buildings, commercial facilities, floors of buildings and commercial facilities, and the like where consumers use power. The consumers use power at the management objects. The consumers refer to individuals, families, groups, companies, organizations, and the like that are subjected to power management by the power management device according to the embodiment of the present technology.

Suppose that the power-related entity includes a power company, a power generator, a power transmission entity, a power distributor, a power retailer, and the like in charge of power generation, power transformation, power transmission, power distribution, buying and selling of power, and the like for supplying power to the consumers. The power-related entity is connected to the management server 1000 via a network. For example, the power retailer included in the power-related entity performs power trading based on a result of power demand prediction.

As shown in FIG. 1, the management server 1000 performing power management puts the plurality of management objects 2000 under the management of the management server 1000, and performs power management for each of the management objects 2000. The management server 1000 and the management objects 2000 are connected to each other via a network 4000 such for example as the Internet.

The power management by the power management device according to the embodiment of the present technology is provided to the consumers as so-called cloud service. The cloud service is provided by a server present on the network, and is one form of use of computers on the basis of the Internet. All of necessary processing is basically performed on the side of the server. A user saves data to the server on the Internet rather than a personal computer, a smart phone, a portable telephone or the like of the user.

For example, the power retailer included in the power-related entity performs power trading. Power is supplied from the power-related entity to each of the management objects.

1-3. Outlines of Power Management by Demands

The power management device according to the embodiment of the present technology predicts an amount of power demand on the trading object day before the trading object day to use the amount of power demand for spot trading. For example, as described above, spot trading is performed two days before the trading object day. The amount of power demand predicted for this spot trading will be referred to as a first predicted amount of power demand. In addition, a predicting process for obtaining the first predicted amount of power demand will be referred to as a first power demand prediction. Spot trading is performed so as to procure power in the first predicted amount of power demand. Incidentally, because the power management is performed with the consumers of the plurality of management objects placed under the management, as described above, the first predicted amount of power demand is obtained by adding together predicted amounts of power demand obtained individually for all of the respective consumers placed under the management.

As will be described later in detail, the prediction of an amount of power demand is performed by predicting the weather on the designated day and the like on the basis of an amount of power consumption in the past, weather information in the past, and the like. Therefore, when the weather on the trading object day or the like is different from the prediction, an error thereby occurs between the predicted amount of power demand and an actual amount of power demand on the designated trading object day. For example, there may be a case where the first predicted amount of power demand is obtained as a small amount because of a low air temperature in the first power demand prediction, but the amount of power demand is increased on the designated trading object day because of a high air temperature and more use of air conditioners by consumers on the designated trading object day.

Accordingly, the present technology assumes that a power demand prediction is performed again after the first power demand prediction. The prediction performed after the first power demand prediction will be referred to as a second power demand prediction. The second power demand prediction is performed after the first power demand prediction such for example as a day before the trading object day. A predicted amount obtained by the second power demand prediction will be referred to as a second predicted amount of power demand. Incidentally, as with the first predicted amount of power demand, the second predicted amount of power demand is obtained by adding together predicted amounts of power demand obtained individually for all of the respective consumers placed under the management.

When there is a difference between the first predicted amount of power demand and the second predicted amount of power demand (which difference will be referred to as a differential amount of power), demands are issued to the consumers to reduce the amount of power demand on the trading object day by an amount equal to the differential amount of power. Incidentally, the demands are instructions to prompt the consumers to take various actions to adjust the amount of power demand.

When the first predicted amount of power demand is insufficient as compared with the second predicted amount of power demand, demands are issued so as to reduce the amount of power demand on the designated trading object day. When the first predicted amount of power demand is larger than the second predicted amount of power demand, demands are issued so as to increase the amount of power demand on the designated trading object day. When the consumers execute the demands and thereby the amount of power demand is adjusted, a need for power trading on the trading object day is eliminated, which is economical.

Figure 2:
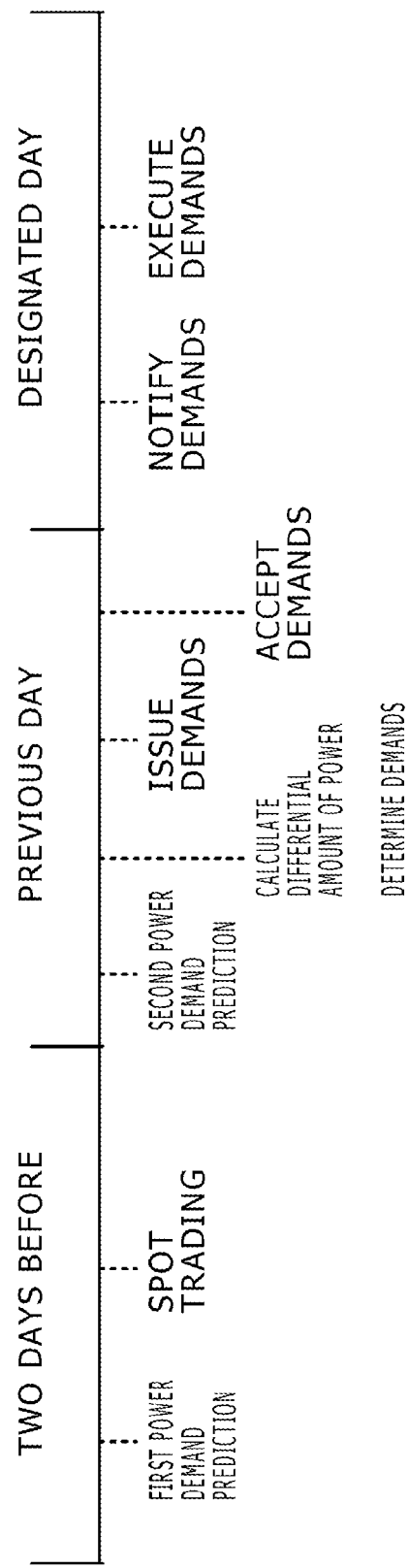
FIG. 2 is a diagram showing events that take place in carrying out the present technology in time series.

FIG. 2 shows events that take place in carrying out the present technology in time series. In the present embodiment, as shown in FIG. 2, the first power demand prediction is performed two days before the designated trading object day, and spot trading is performed on the basis of a result of the prediction. Then, the second power demand prediction is performed on a next day, that is, a day before the trading object day. In addition, a differential amount of power is calculated from the first predicted amount of power demand and the second predicted amount of power demand. Incidentally, the first predicted amount of power demand and the second predicted amount of power demand are collectively calculated for the power demand of the plurality of consumers bundled by the entity performing power management rather than individually for each consumer. Thus, the differential amount of power is similarly calculated collectively for the plurality of consumers bundled by the entity performing power management rather than individually for each consumer.

Demands to be presented are determined on the basis of the calculated differential amount of power. Then, the demands are issued and thereby presented to the consumers. Incidentally, the demands are determined individually for each consumer.

In response to this, the consumers accept the demands. The "acceptance" in this case is an indication of an intention of the consumers to accept in advance and execute the issued demands.

Then, on the designated trading object day, the demands are notified to the consumers to prompt the consumers to execute the demands. In response to the notification, the consumers execute the demands. When the consumers execute the demands, the amount of power demand of the consumers on the designated day is adjusted. This can reduce the differential amount of power, and eliminate a need to procure power by power trading on the designated trading object day.

In the present technology, the demands are issued to the plurality of consumers, and of the plurality of consumers, consumers intending to meet the demands accept the demands. Then, the reception of acceptances is ended at a point of time that the amount of power demand to be adjusted by the execution of demands by a plurality of consumers reaches the differential amount of power. That is, the consumers who can execute the demands are determined on a first-come, first-served basis.

Further, in the present technology, points are given to the consumers who have executed the demands. Suppose that a certain amount of points accumulated can be exchanged for various goods and services. This can give the consumers an incentive to execute the demands. Details of the giving of points will be described later.

Incidentally, the second power demand prediction does not necessarily need to be performed on the day following the day of the first power demand prediction, but may be performed at any time as long as the second power demand prediction is performed after the first power demand prediction. In the above description, the first predicted amount of power demand is obtained two days before the trading object day, and the second predicted amount of power demand is obtained on the day before the trading object day. However, for example, in addition to this, the first predicted amount of power demand may be obtained on the day preceding the trading object day, spot trading may be performed on the preceding day, and the second predicted amount of power demand may be obtained on the designated trading object day.

1-4. Configuration of Power Management Device

Figure 3:
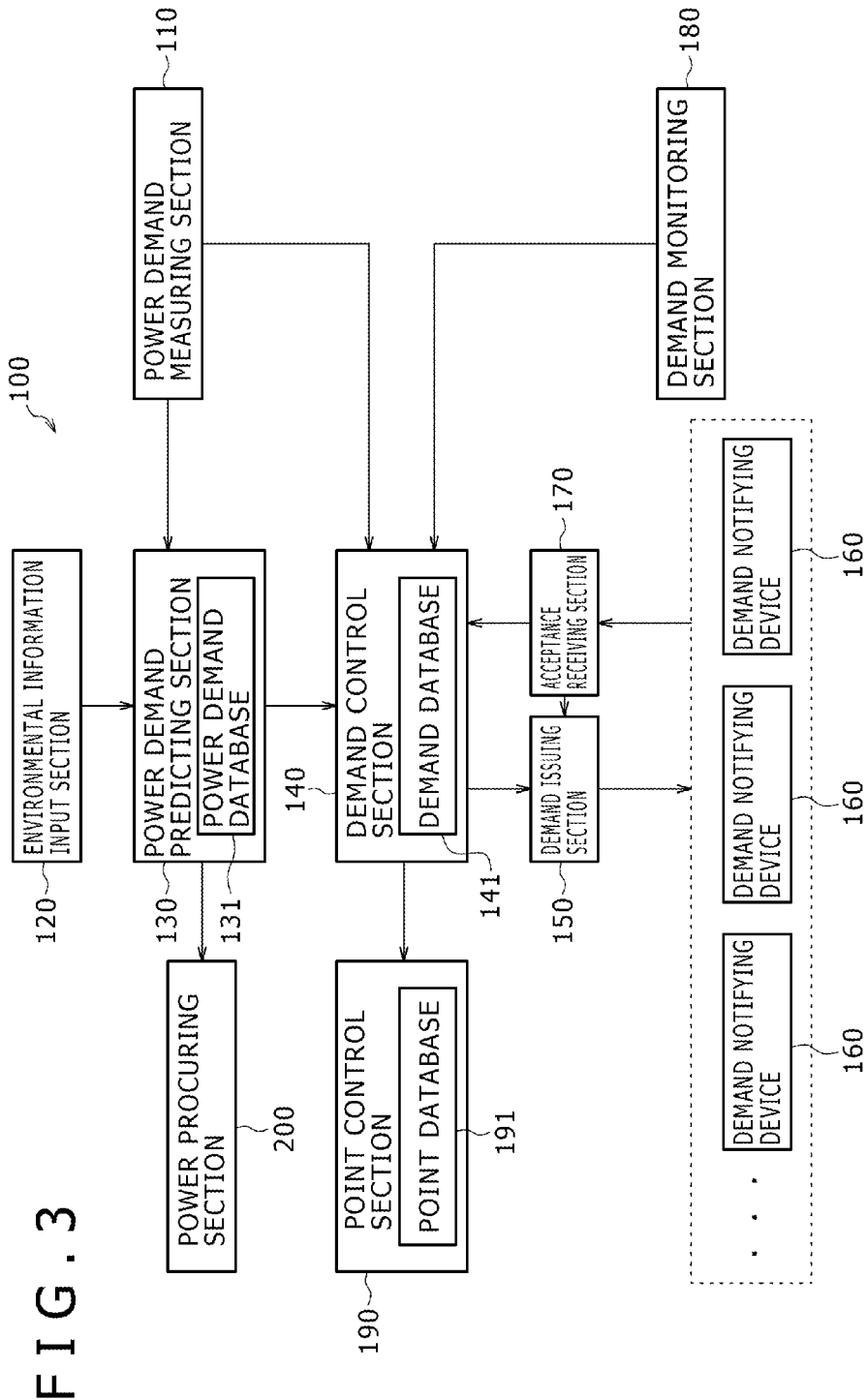
FIG. 3 is a block diagram showing a configuration of the power management device.

A configuration of the power management device 100 according to the embodiment of the present technology will next be described. FIG. 3 is a block diagram showing a first example of configuration of the power management device 100 performing power management by demands. The power management device 100 includes a power demand measuring section 110, an environmental information input section 120, a power demand predicting section 130, a demand control section 140, a demand issuing section 150, a demand notifying device 160, an acceptance receiving section 170, a demand monitoring section 180, and a point control section 190.

The power demand measuring section 110, the environmental information input section 120, the power demand predicting section 130, the demand control section 140, the acceptance receiving section 170, and the point control section 190 are composed of for example a CPU (Central Processing Unit), a RAM (Random Access Memory), and a ROM (Read Only Memory). The ROM stores a program read by the CPU. The RAM is used as a work memory for the CPU. The CPU performs processing corresponding to each part by executing the program stored in the ROM.

The power demand measuring section 110 is connected to a power measuring device for measuring an amount of power consumption by a consumer via a network such for example as the Internet. The power measuring device is for example disposed in the house or the like of the consumer as a management object. The amount of power consumption by the consumer is thereby obtained. This amount of power consumption becomes an amount of power demand needed by the consumer. Incidentally, the power measuring device has functions of an ammeter and functions of a voltmeter, and thereby measures power. The power measuring device may also measure power by obtaining and analyzing a current waveform.

The power demand measuring section 110 is also connected to a generated power amount measuring device for measuring an amount of power generated by power generating equipment when the consumer has the power generating equipment, and is also connected to a stored power amount measuring device for measuring an amount of power stored by storage equipment when the consumer has the storage equipment. The amount of power generated by the power generating equipment and the amount of power stored in the storage equipment are thereby obtained. Then, an amount of power that needs to be procured by the consumer is calculated as an amount of power demand from the amount of power consumption, the amount of power generated by the power generating equipment, and the amount of power stored in the storage equipment. The calculated amount of power demand is supplied to the power demand predicting section 130.

Incidentally, when the consumer owns the power generating equipment and the storage equipment, and all of the power obtained by the power generating equipment is allocated for home consumption, the amount of power demand is "Amount of Power Consumption+Amount of Power Generated from Power Generating Equipment+Amount of Discharge from Storage Equipment." When the consumer owns the power generating equipment only, and all of the power obtained by the power generating equipment is allocated for home consumption, the amount of power demand is "Amount of Power Consumption+Amount of Power Generated from Power Generating Equipment." When the consumer owns the storage equipment only, and the power stored in the storage equipment is allocated for home consumption, the amount of power demand is "Amount of Power Consumption+Amount of Discharge from Storage Equipment." Incidentally, power is stored in the storage equipment through the purchasing of power or the like. When the consumer does not own the power generating equipment nor the storage equipment, the amount of power demand is equal to the amount of power consumption.

Incidentally, the storage equipment for example includes a storage battery module for storing electricity, a storage control section for storage control and management, and the like. Any storage battery module, such for example as a lithium ion secondary battery, a lithium ion polymer secondary battery, a nickel metal hydride battery, or the like, may be used as long as the storage battery module can be charged and discharged.

The power generating equipment produces power by converting energy other than power into power. The power generating equipment preferably uses energy referred to as natural energy, renewable energy, or the like involving a low load on the environment. For example, the power generating equipment uses solar light, solar heat, wind power, water power, micro water power, tidal force, wave power, water temperature difference, ocean currents, biomass, geothermal heat, the energy of sound or vibration, or the like. In addition, the power generating equipment may be for example an exercise bicycle having a power generating function, a floor having a mechanism for generating power when people walk on the floor (which floor is referred to as a power generating floor or the like).

Description will return to that of the power management device 100. The environmental information input section 120 is to obtain environmental information and input the environmental information to the power demand predicting section 130. The environmental information includes for example weather information on a kind of weather such as a clear weather, a cloudy weather, a rain, a snow, or the like, an air temperature, humidity, precipitation, wind force, an amount of sunshine, and the like. The environmental information input section 120 may for example obtain weather information provided by the Meteorological Agency or the like as environmental information via a network such as the Internet or the like. In addition, the environmental information input section 120 may be connected to various kinds of measuring devices such as a thermometer, a hygrometer, a rain gauge, a wind gauge, and the like, and obtain weather information from these measuring devices. Further, the environmental information input section 120 may obtain weather information from a weather information database provided by an ordinary company or the like.

The power demand predicting section 130 performs the first power demand prediction and the second power demand prediction described above. Suppose that the power demand predicting section 130 has a clock function and calendar information, and can grasp dates and time at present, in the past, and in the future. The first power demand prediction predicts an amount of power demand of the consumers on the trading object day of spot trading.

The power demand predicting section 130 has a power demand database 131. The power demand predicting section 130 stores the amount of power demand in the past which amount of power demand is supplied from the power demand measuring section 110, the environmental information supplied from the environmental information input section 120, and the date and time in the power demand database 131 in association with each other. Referring to the power demand database 131, the power demand predicting section 130 predicts an amount of power demand of the consumers on a prediction date and time.

The power demand prediction in the power demand predicting section 130 is for example performed on the basis of the information stored in the power demand database 131 by performing learning using neural network processing as described in Patent Document 1, an existing learning algorithm, inductive learning, and the like. The neural network processing is an information processing mechanism capable of pattern recognition and prediction, which information processing mechanism is constructed by imitating the mechanism of the human brain.

The power demand prediction performed while such learning is performed can calculate a tendency for a consumer to be present or absent, such for example as a tendency for the consumer to be out and thus absent on every Monday, a tendency for the consumer to be out and thus absent from 12 to 17 on Saturdays, a tendency for the consumer to be out and thus absent on the 10th day of every month, and the consumer being present from 19 to 24 every day. Then, a state of the consumer being present or absent on a prediction day is predicted, and the power demand prediction is performed from the amount of power consumption in the past which amount corresponds to the state of the consumer being present or absent, the environmental information on past weather and the amount of power consumption, and the like.

The first predicted amount of power demand which amount is obtained by the power demand predicting section 130 is for example supplied to a power procuring section 200 for procuring power through communication with the outside. The power procuring section 200 is connected to the power-related entity supplying power via a network or the like. The first predicted amount of power demand which amount is obtained by the power demand predicting section 130 is transmitted as an amount of power to be procured to the power-related entity. Incidentally, the first predicted amount of power demand of each consumer is calculated individually, thereafter added up, and transmitted as the amount of power to be procured to the power-related entity.

Then, for example, the power retailer included in the power-related entity performs spot trading based on the first predicted amount of power demand. The first predicted amount of power demand may be used by the power retailer, or may be used by the power company. Ultimately, the amount of power according to the power trading is supplied from the power-related entity to each consumer.

The second predicted amount of power demand is calculated in a similar manner to the first predicted amount of power demand. The calculated second predicted amount of power demand is supplied to the demand control section 140. Incidentally, as described above, the second predicted amount of power demand is calculated after the calculation of the first predicted amount of power demand (for example on the day preceding the trading object day of spot trading).

Description will return to that of the power management device 100. The demand control section 140 calculates a differential amount of power from the first predicted amount of power demand and the second predicted amount of power demand that are supplied from the power demand predicting section 130. Incidentally, as described above, the first predicted amount of power demand and the second predicted amount of power demand are sums of predicted amounts of power demand of all of the consumers placed under the management of the power management device 100. Therefore the differential amount of power is also calculated as a sum for all of the consumers rather than individually for each consumer.

The differential amount of power is negative (power is insufficient) when the first predicted amount of power demand is smaller than the second predicted amount of power demand. On the other hand, the differential amount of power is positive (power is more than sufficient) when the first predicted amount of power demand is larger than the second predicted amount of power demand.

That is, the differential amount of power indicates whether power procured on the basis of the first predicted amount of power demand which amount is predicted in advance is insufficient or more than sufficient on the designated day.

In addition, the demand control section 140 retains, in advance, information on kinds and the number of electric devices used by the consumers as management objects, the power consumption of each electric device (power consumption in each operation mode when the electric device has a plurality of operation modes), and the like.

These pieces of information may be obtained by visiting the house or the like of each consumer by an entity providing service using the embodiment of the present technology, and stored in the demand control section 140. In addition, the information may be provided from the consumers at a time of signing up for the service using the embodiment of the present technology, and stored in the demand control section 140. Further, the information may be obtained automatically by device sensors or the like.

A device sensor is for example formed by an IC (integrated circuit) or the like, and provided to the distribution board of a house. The device sensor detects which of electric devices connected to the distribution board via outlets is operating, and further measures the amount of power consumption of the operating electric device. The device sensor obtains a current waveform by measuring the value of a current flowing through the distribution board. The waveform of the current supplied to the electric device differs according to the type, the manufacturer, and the like of the electric device. Accordingly, for example, the device sensor retains the waveform of each device at a normal time in advance, and is able to determine the type of the operating electric device connected to the distribution board by comparing the waveform with a current waveform at a time of power supply. Further, the device sensor measures the amount of power consumption of the electric device on the basis of the obtained current waveform.

It is thus possible to grasp what kinds of electric devices are connected to the distribution board, which electric device is operating, and the amount of power consumption of the electric device. These pieces of information are for example transmitted to the demand control section 140 of the power management device 100 via a network such as the Internet or the like.

In addition, any device other than the device sensor provided to the distribution board as described above may be used for the detection of the types of the electric devices and the operating device as well as the measurement of the amount of power consumption as long as the device can perform the detection and the measurement. As another method, a so-called smart tap, for example, may be used.

The smart tap is a power consumption measuring device including a power sensor and a communication module. The smart tap is inserted into an outlet, and is used in a state of being connected with an electric device whose power consumption is desired to be grasped. The smart tap measures and analyzes the conditions of power use by each electric device in real time. Data on the measurement and the analysis is sent to the power management device 100 by the communication module provided to the smart tap or the like. Because the waveform or the like of a current when an electric device is used differs depending on the type of the electric device, the type of the connected electric device and the power consumption of the electric device can be grasped from the data on the measurement and the analysis by the smart tap.

Electric devices in ordinary households includes a television receiver, an audio device, a refrigerator, a microwave oven, a washing machine, air conditioning equipment, an iron, a dryer, an electric heater, an electric cooking stove, an oven, an electrically heated carpet, a personal computer, a copier, a fax machine, a printer, and the like. Electric devices in stores, commercial facilities, and the like include lighting equipment, air conditioning equipment, transportation equipment such as an elevator, and the like. Incidentally, electric devices are not limited to these devices, but may be any device as long as the device operates on power.

Description will return to that of the functions of the demand control section 140. The demand control section 140 determines demands to be issued to the consumers according to the differential amount of power. As described above, the demands are instructions to prompt the consumers to take various actions to adjust the amount of power demand of the consumers. The demand control section 140 retains a history of demands issued in the past for each consumer and the response of the consumers to the demands in the demand database 141. Referring to the history relating to the demands in the past, the demand control section 140 determines a demand for each consumer.

The demand when the differential amount of power is negative has contents for reducing the amount of power consumption. For example, the demand has contents for turning off power to an electric device, changing settings of an electric device, issuing coupons of various kinds of stores, and notifying events.

Turning off power to an electric device is to request the consumer to turn off power to an electric device such as a television set, an air conditioner, a personal computer, a light, or the like used by the consumer. This can reduce the amount of power demand of the consumer. Changing settings of an electric device reduces the amount of power demand by changing the various settings of the electric device without turning off power to the electric device by setting the air conditioner to a lower temperature, for example.

Issuing coupons of various kinds of stores is to issue coupons by which a discount or other service can be received at restaurants or the like. An incentive to go out can be given to the consumers by issuing the coupons. When the consumers go out, the use of electric devices within the houses is stopped, so that the amount of power consumption can be reduced. Incidentally, the coupons are desirably provided as electronic coupons via electronic mail or the like.

Notifying events is to notify the description, the dates and times, and the like of events such as festivals, various kinds of music events, movie events, sports events, parades, various kinds of traditional events, and the like. An incentive to go out can be given to the consumers by notifying the holding of the events. When consumers are interested in the events and go out, the use of electric devices within the houses is stopped, so that the amount of power demand can be reduced.

On the other hand, the demand has contents for increasing the amount of power demand when the differential amount of power is positive, that is, when the first predicted amount of power demand is larger than the second predicted amount of power demand (procured power is higher than power to be used). For example, the demand may prompt efficient use of electric devices. For example, when a washing machine is operated to do the laundry in a case where the power is more than sufficient, laundry does not need to be done in a near future when the power is insufficient, so that electricity can be used efficiently.

Incidentally, a value obtained from a difference between the first predicted amount of power demand and the second predicted amount of power demand may be used as it is as the differential amount of power, or the differential amount of power may be adjusted. This point will be described.

In the present technology, demands are issued to reduce the differential amount of power by adjusting the amount of power demand of the consumers. However, there are a wide variety of consumers, and thus the consumers do not necessarily execute demands properly. When the consumers do not execute demands properly, the amount of power demand of the consumers is not adjusted, and thus the differential amount of power cannot be reduced.

Accordingly, the differential amount of power is increased by a predetermined amount and set. In the following, for convenience of description, an original differential amount of power will be referred to as a target differential amount of power as a reduction target. In addition, the differential amount of power that is increased will be referred to as an increased differential amount of power.

Suppose for example that the past history indicates that a reduction of about 80% of the target differential amount of power has thus far been achieved each time. In this case, the increased differential amount of power is set such that 80% of the increased differential amount of power is the target differential amount of power. This makes it possible to achieve a reduction of the target differential amount of power even when a reduction achieved by executing demands is 80% of the increased differential amount of power.

Thus, when the target differential amount of power is 100 kw, for example, the increased differential amount of power is set at 125 kw so that a reduction of the 100 kw can be achieved. When the increased differential amount of power is 125 kw, and a reduction of 80% of the increased differential amount of power is achieved, a reduction of 100 kw, which is the target differential amount of power as the original differential amount of power, is achieved. Incidentally, the increase in the differential amount of power is preferably determined by learning from the past history.

Description will next be made of the determination of demands. As described above, the demands issued to the consumers in the past and the responses of the consumers to the demands are stored in the demand database 141 of the demand control section 140 in association with each other. As shown in FIG. 4, the demand control section 140 calculates demands and rates of execution of the demands from the types of the demands in the past and the responses of the consumer to the demands.

In FIG. 4, each type of demand is associated with an execution rate as a ratio at which the consumer executed the demand properly, and the execution rates are arranged in decreasing order. The demands shown in FIG. 4 are a mere example, and more demands can be issued. In addition, the execution rates and the ranking are also an example.

When demands having high execution rates are determined as demands to be issued preferentially according to the demand database 141, demands matched to each consumer can be issued. For example, demands having three highest execution rates are determined as demands to be issued. The number of demands to be issued may be three or more, or may be one. This enables efficient power adjustment by demands. In addition, from the viewpoint of the consumer, demands that the consumer is not willing to meet or cannot meet are notified less often, so that the consumer can be prevented from feeling annoyed by the demands.

Incidentally, responses of the consumer to the demands which responses are obtained by the demand monitoring section 180 to be described later are supplied as feedback to the demand control section 140. Using this feedback, the demand control section 140 updates the demand database 141 at all times. Thus, the more the service according to the embodiment of the present technology is used, the more the issued demands are matched to the preferences of the consumers.

Incidentally, the determination of demands needs to be made in association with the power consumption of the electric devices used by the consumer. As described above, the demand control section 140 retains, in advance, information indicating kinds and the number of electric devices used by the consumers as management objects, the power consumption of each electric device, and the like. In addition, a reduction in power when the consumer is out can be grasped from the response of the consumer to the demand in the past.

Suppose for example that the differential amount of power is −20 wh, and that the amount of power demand needs to be reduced by 20 wh. In this case, demands are determined by giving priority to demands having high execution rates as described above and referring to the power consumption of the electric devices. For example, when a demand is "turning off an electric device," an electric device that can achieve a reduction of 20 wh by being turned off is determined by referring to the power consumption of the electric devices. This reduction may be achieved by one electric device, or may be achieved by turning off a plurality of electric devices.

In addition, for a consumer who needs a reduction of 20 wh but has executed the demand for turning off an electric device at a low execution rate, a demand prompting the consumer to go out, such as the issuance of a coupon, the notification of an event, or the like, is selected.

Such determination of demands can be made by learning using publicly known neural network processing, inductive learning, and the like on the basis of the demands issued in the past and the rates of execution of the demands by the consumer, the power consumption of the electric devices, an amount of power reduction during absence, and the like.

The demand control section 140 instructs the demand issuing section 150 to issue the determined demands. The demand issuing section 150 is for example connected to the demand notifying devices 160 via a network such as the Internet or the like. The demand issuing section 150 transmits demand information to the plurality of demand notifying devices 160 in order to present the demands to the plurality of consumers. In addition, on the designated trading object day, the demand issuing section 150 transmits the demand information to the plurality of demand notifying devices 160 in order to notify the demands to the plurality of consumers by the demand notifying devices 160.

The demand notifying devices 160, 160, . . . present and notify the demands transmitted from the demand issuing section 150 to the consumers. Configurations of a demand notifying section will be described in the following with reference to FIGS. 5A and 5B.

Figure 5A:
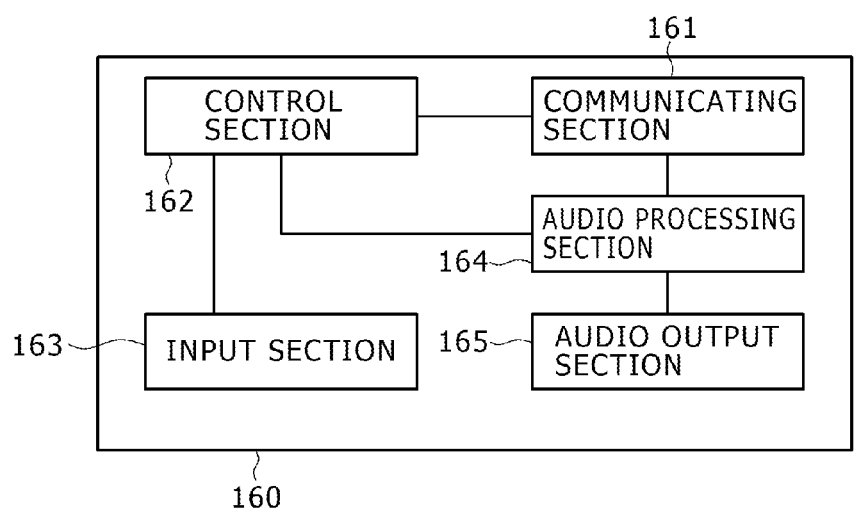
FIGS. 5A and 5B are block diagrams showing configurations of a demand notifying device.

FIG. 5A is a diagram showing a first example of a demand notifying device 160. The demand notifying device 160 in the first example includes a communicating section 161, a control section 162, an input section 163, an audio processing section 164, and an audio output section 165.

The communicating section 161 is for example a communication module or a network interface for communicating with the demand issuing section 150 forming the power management device 100 via a network such as the Internet, a dedicated line, or the like on the basis of a predetermined protocol. A communication system may be any system, including wire communications, communications using a wireless LAN (Local Area Network), Wi-Fi (Wireless Fidelity), or a 3G line, and the like. The communicating section 161 receives the audio data of the demands transmitted from the demand issuing section 150 via the network such as the Internet or the like.

The control section 162 is for example composed of a CPU, a RAM, and a ROM. The ROM stores a program read by the CPU. The RAM is used as a work memory for the CPU. The CPU controls each part and the whole of the demand notifying device 160 by performing various processes on the basis of the program stored in the ROM.

The input section 163 performs input to select and accept a demand by the consumer. The input section 163 includes a touch screen formed integrally with a display section, a physical button for receiving the input by the consumer, and the like. When input to the input section 163 is performed, the control section generates acceptance information indicating the selected demand and a state of acceptance in response to the input.

The audio processing section 164 subjects the audio data to predetermined processing such as decoding processing, amplification processing, and the like, and then supplies the audio data to the audio output section 165. The audio output section 165 is a speaker for outputting audio under control of the control section 162. An audio announcement corresponding to demands is output from the audio output section 165.

A method for presenting issued demands may include for example attaching numbers to the demands to be presented and presenting demand items in order by audio together with the numbers from the audio output section such as the speaker or the like. An audio announcement such for example as "Demand can be met by suppressing the use of the following devices. Press an appropriate number. 1. Dryer, 2. Television Set, 3. Air Conditioner" is made. In response to this, the consumer inputs the number of the demand to accept using the input section 163.

Figure 5B:
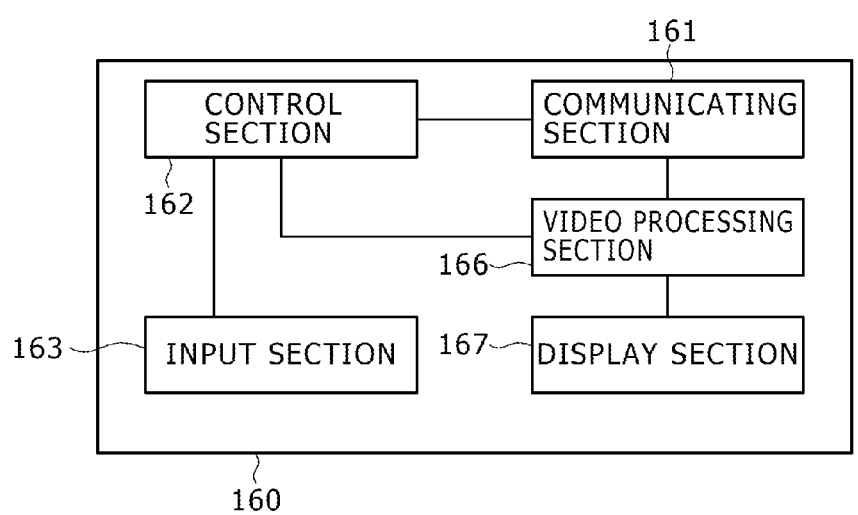

FIG. 5B is a diagram showing a second example of the demand notifying device 160. The demand notifying device 160 in the second example includes a communicating section 161, a control section 162, an input section 163, a video processing section 166, and a display section 167. The communicating section 161, the control section 162, and the input section 163 are similar to those of the first example. The communicating section 161 receives the video data of demands transmitted from the demand issuing section 150 via a network such as the Internet or the like. The video data is supplied to the video processing section 166. The video processing section 166 subjects the video data to predetermined processing, and then supplies the video data to the display section 167.

The display section 167 is for example formed by an LCD (Liquid Crystal Display), a PDP (Plasma Display Panel), an organic EL (Electro Luminescence) panel, or the like. The display section 167 displays a text message describing demand contents or the like under control of the control section 162. The demands can be thereby notified to the consumer.

As shown in FIGS. 6A and 6B, for example, the issued demands are presented by displaying an image or video showing the types of demands, selecting icons for indicating whether to accept the demands, and the like on the display section. In response to this, the consumer indicates acceptance by performing an input operation on the input section.

In the examples of FIG. 6A and FIG. 6B, when the consumer accepts a demand, the consumer selects the demand by checking a check box on the side of the demand item, and performs input to "YES" in a section of "DO YOU ACCEPT?" in a lower part of a screen. When the consumer does not accept the demand, on the other hand, the consumer performs input to "NO" in the section of "DO YOU ACCEPT?"

In addition, a "PENDING" button may be provided in the section of "DOU YOU ACCEPT?" on the demand presenting screen to allow an answer as to whether to accept or not to be reserved. In addition, when there is no input for a certain period after a demand is presented, the demand may be treated as not being accepted.

In addition, a demand may be presented by using a message such as electronic mail or the like usable by a portable telephone, a smart phone, a personal computer, or the like. In that case, for example, a link (hyperlink) is described for each demand being presented. Then, the consumer may click the link to accept the demand.

In addition, the demand notifying device 160 notifies the demand to prompt the consumer to execute the demand on the designated trading object day. This notification of the demand is made by issuing the demand by the demand issuing section 150 also on the designated trading object day, and receiving the demand and making a notification according to the issued demand by the demand notifying device 160. It is preferable that the notification of the demand be made for example 30 minutes, 15 minutes, or five minutes before a time of execution of the demand. A method of notifying demand includes for example the turning on of an LED or the like, various kinds of text messages such as electronic mail and the like, audio announcements, and the like.

The audio announcements include for example "Turn off the TV between 13 and 14," "Lower the set temperature of the air conditioner by one degree between 15 and 16," and "A festival is being held in front of the station." The demands can be thereby notified to the consumer. In addition, an alarm sound may be output.

Incidentally, when the method of presenting the demands and the method of notifying the demands are various kinds of text messages such as electronic mail or the like, the demand issuing section 150 is a message transmitting server, and the demand notifying device 160 is a mail receiving terminal such as a portable telephone, a smart phone, a personal computer, or the like. When a demand notifying section is an audio announcement, the demand issuing section 150 is an audio information transmitting device, and the demand notifying section is an audio output device having a speaker or the like. In addition, in the case of a smart phone, the smart phone may be provided with a function (the turning on of an LED, audio, a text message, and the like) corresponding to demand notification according to the embodiment of the present technology by installing an application thereon.

The demand notifying device 160 is not limited to the above, but the demand notifying device 160 may combine the first example and the second example described above, and thus include the audio processing section 164, the audio output section 165, the video processing section 166, and the display section 167. This makes possible a notification such that, for example, the display section 167 displays a message, the audio output section 165 makes an audio announcement after the passage of a predetermined time, and the audio output section 165 sounds an alarm after the passage of another predetermined time. The demands can be thereby notified to the consumer surely. Incidentally, the demand notifying device is not limited to the above, but may be any device as long as the device can inform the consumer of demands.

In addition, the device that presents the issued demands and the device that notifies the demands may be separate from each other. For example, an issued demand is presented by a message such as electronic mail or the like, and the demand is notified on the designated trading object day by blinking an LED in a device including the LED.

In addition, the demand notifying device 160 may be a plug having the above-described configuration rather than an independent device. In this case, a plug to which an electric device corresponding to a demand is connected preferably notifies the demand.

Description will return to that of the power management device 100 with reference to FIG. 3. The acceptance receiving section 170 receives acceptance information transmitted from the demand notifying devices 160 via a network or the like. The acceptance receiving section 170 supplies the acceptance information to the demand control section 140. The information indicating which demand a consumer accepted is thereby supplied. The acceptance receiving section 170 receives acceptances from consumers until a total of amounts of power demand adjusted by demands accepted by a plurality of consumers reaches the differential amount of power.

Then, the acceptance receiving section 170 closes the reception of acceptances from consumers at a point in time that the total of amounts of power demand adjusted by demands reaches the differential amount of power.

When the acceptance receiving section 170 has closed the reception of acceptances, the acceptance receiving section 170 notifies the demand issuing section 150 that the reception of acceptances is closed. In response to this, the demand issuing section 150 ends the issuance of demands to the consumers.

The demand monitoring section 180 monitors and grasps conditions of execution of demands by consumers. When the issued demands are to turn off electric devices or change settings of electric devices, the demand monitoring section 180 obtains amounts of power consumption of the consumers from power consumption measuring devices for measuring the amounts of power consumption of the consumers, the power consumption measuring devices being provided to the houses of the consumers.

In addition, when the demands are coupons of various kinds of stores, coupon use information is received from a cash register system, a POS (Point Of Sales) system, or the like for managing bill payments and the use of coupons at the stores. For example, when unique identifiers are given to electronic coupons transmitted to consumers via electronic mail or the like, it is possible to determine which electronic coupon has been used, and thus determine whether the consumer has met the demand.

In addition, when the demands are the notification of events, a GPS (Global Positioning System) system is used which includes a GPS transmitter and a GPS receiver for determining whether a consumer is out or not by grasping the position of the consumer by a GPS, for example. Incidentally, when it cannot be determined that a coupon has been used or the consumer is out, conditions of response of the consumer may be monitored and grasped from the amount of power consumption of the consumer which amount is obtained from a power consumption measuring device provided to the house of the consumer or the like. This is because when the consumer uses a coupon or goes to an event, for example, and is thus out, electric devices are not used, and the amount of power demand should be decreased.

Information indicating the conditions of execution of demands by the consumers which information is obtained by the demand monitoring section 180 is supplied to the demand control section 140, and is stored in the demand database 141 in such a manner as to be associated with the demands. As the demand database 141 stores the conditions of execution of demands by the consumers which conditions are obtained by the demand monitoring section 180, demands more matched to the preferences of the consumers can be issued.

The point control section 190 sets the rates of points to be given to the consumers, and issues points to the consumers. Further, the point control section 190 includes a point database 191, and also manages the points of each consumer. The point control section 190 manages the points given to the consumers in the point database 191 on a customer-by-customer basis. The addition of points, the subtraction of points, and the retention of points are performed by increasing or decreasing point information stored in the point database 191.

Description will be made in the following of a mechanism for giving points to the consumer in the present embodiment. The number of points to be given may be for example set individually on the basis of types of demands, reduced amounts of power demand, and the like. For example, one point is given for each reduction of 100 wh. In addition, a same number of points may be given uniformly irrespective of types of demands or reduced amounts of power demand.

In the present embodiment, as described above, issued demands are first presented to the consumers. When a consumer accepts a demand, acceptance information indicating that the consumer has accepted the demand is supplied from the acceptance receiving section 170 to the point control section 190. Then, the consumer who has accepted is given a predetermined amount of points. Incidentally, as described above, the acceptance receiving section 170 closes the reception of acceptances from consumers at a point in time that amounts of power demand to be adjusted by executing demands reach the differential amount of power. Thus, acceptances are received on a first-come, first-served basis, and consumers who can obtain points by indicating acceptance are also determined on a first-come, first-served basis.

The demand monitoring section 180 grasps the meeting of demands by the consumer. When the consumer executes the demand, the points given by the point control section 190 to the consumer at the time of the acceptance of the demand are retained. The points given to the consumer are thereby determined.

When the consumer does not execute the demand, on the other hand, the point control section 190 deducts a predetermined amount of points from the points of the consumer. Incidentally, the points deducted at this time are set to be more than the points given at the time of the acceptance of the demand. This makes final points fewer than at the time of the acceptance of the demand. This can prevents the consumer from thoughtlessly accepting demands.

The present embodiment gives points at the time of acceptance of a demand rather than at a time of execution of the demand by the consumer. This can give the consumer an incentive to execute the demand because the points are first increased formally at the time of acceptance of the demand. Therefore the number of consumers who execute demands is expected to increase.

Incidentally, it is preferable that the point information indicating the above-described increase or decrease in the number of points be transmitted to the side of the consumer via the network in response to a request from the consumer so that the consumer can refer to the points of the consumer at any time.

The points are preferably exchangeable for goods and services by the entity itself that performs power management according to the embodiment of the present technology, another entity affiliated with the entity that performs power management according to the embodiment of the present technology, or the like. The goods and services provide some physical and mental effect or satisfaction or the like. Of the goods and services, tangible things are goods, and intangible things not left after being sold and bought are services.

The goods include for example miscellaneous goods for daily use, household appliances, electronic devices, foods, and the like. Cash vouchers include gift certificates, beer coupons, travel coupons, book coupons, airline tickets, event viewing tickets, and the like. The services include leisure services, medical services, lodging services, educational services, transport services, food services, consulting services, and the like. In addition, points may be exchangeable for points of another point service such as mileage service. The goods and services are not limited to the above, but may be any goods and services as long as the goods and services are objects of economic trading.

Figure 7:
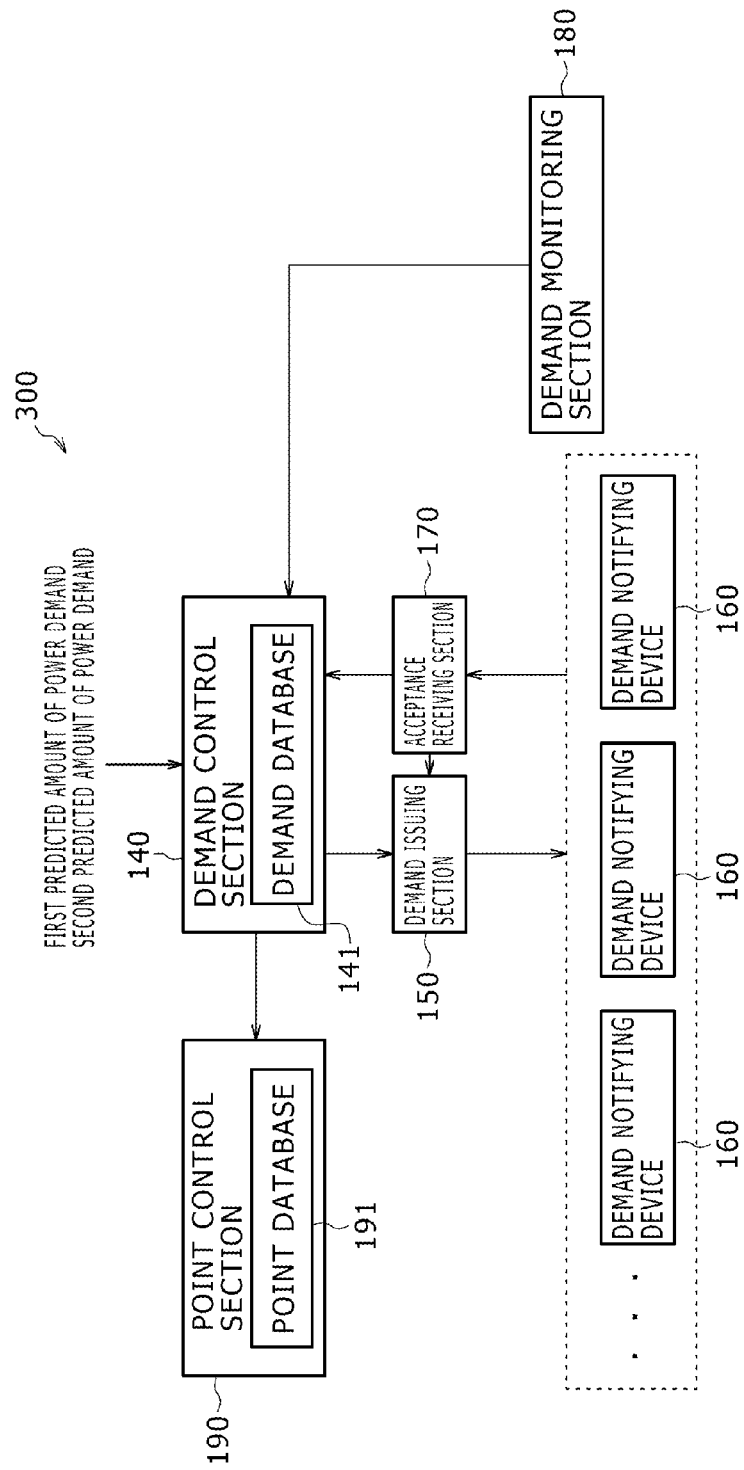
FIG. 7 is a block diagram showing a configuration of a second example of the power management device.

The first example of the power management device is configured as described above. FIG. 7 is a diagram showing a second example of configuration of the power management device. The power management device 300 in the second example does not include the power demand measuring section 110, the environmental information input section 120, and the power demand predicting section 130. The power management device 300 in the second example does not calculate the first predicted amount of power demand nor the second predicted amount of power demand, but uses the first predicted amount of power demand and the second predicted amount of power demand calculated by another system or another entity, for example. The other configuration of the power management device 300 is similar to that of the first example. The configuration in this second example can adjust power demand by demands and issue points in a similar manner to the first example.

1-5. Process of Power Management by Demands and Process of Giving Points

Description will next be made of power management by demands and the giving of points that are performed by the power management device described above. Suppose that power management is performed when power is procured by spot trading described above.

First, in step S1, the power demand predicting section 130 calculates a first predicted amount of power demand for use in spot trading. The calculated first predicted amount of power demand is supplied to the power procuring section 200. The power procuring section 200 transmits the first predicted amount of power demand to the power-related entity. Then, the power-related entity performs spot trading, and procures power for the next day but one, which day is a trading object day. The first predicted amount of power demand is also supplied to the demand control section 140.

On a day preceding the trading object day, the power demand predicting section 130 in step S2 next performs second power demand prediction for predicting an amount of power demand on the designated trading object day. The second predicted amount of power demand obtained by the second power demand prediction is supplied to the demand control section 140.

Next, in step S3, the demand control section 140 calculates a differential amount of power as a difference between the first predicted amount of power demand obtained for spot trading in step S1 and the second predicted amount of power demand obtained in step S2.

Next, in step S4, the demand control section 140 determines a demand for adjusting the amount of power demand on the trading object day on the basis of the differential amount of power. As described above, this demand is obtained by referring to the demand database storing demands in the past and conditions of response of the demands by the consumers in association with each other.

Next, in step S5, the demand issuing section 150 issues the demand to the consumer. The issued demand is presented to the consumer by the demand notifying device 160. In response to this, the consumer accepts the demand.

Next, in step S6, whether a total of amounts of power demand to be adjusted by executing demands accepted by a plurality of consumers has reached the differential amount of power is determined. When the total of amounts of power demand to be adjusted by executing demands has not reached the differential amount of power, the process returns to step S5 to repeat step S5 and step S6 until the total of amounts of power to be adjusted by executing demands reaches the differential amount of power (No in step S6). In this case, for example, demands are issued periodically at predetermined time intervals.

When the total of amounts of power demand to be adjusted by executing accepted demands has reached the differential amount of power, on the other hand, the process proceeds to step S7 (Yes in step S6). Next, in step S7, the acceptance receiving section 170 ends the reception of acceptances. In addition, receiving a notification to the effect that the total of amounts of power to be adjusted by executing accepted demands has reached the differential amount of power, the demand issuing section 150 ends the issuance of demands.

Next, in step S8, the point control section 190 gives points to the consumer who accepted the demand before the end of the reception of acceptances.

Next, on the trading object day, the demand notifying device 160 in step S9 notifies the demand to the consumer who accepted the demand before the end of the reception of acceptances to prompt for the execution of the demand. Then, in step S10, the demand monitoring section 180 monitors and grasps whether the consumer has executed the demand, and supplies the result to the demand control section 140. When it is determined from the result that the consumer has executed the demand, the process proceeds to step S11 (Yes in step S10). The information indicating that the consumer has executed the demand is supplied to the point control section 190.

Next, in step S11, the point control section 190 determines the points given in step S8 to the consumer who has executed the demand. The points of the consumer who has executed the demand are thereby added.

When it is not determined in step S10 that the consumer has executed the demand, on the other hand, the process proceeds to step S12 (No in step S10). Then, in step S12, the point control section 190 subtracts from the points of the consumer who accepted the demand but has not executed the demand. The points of the consumer who accepted the demand but has not taken action according to the demand are thus decreased.

Incidentally, when points are subtracted, points more than the number of points added in step S8 are subtracted. Then, the points possessed by the consumer are fewer than the points before the consumer accepted the demand. This can prevent an act of accepting a demand even though the consumer has no will to execute the demand, and give points to a consumer who has a will to execute a demand. Power management by issuing demands is performed as described above.

Incidentally, in the second example of the power management device described above, the power management device 300 does not perform power demand prediction, and thus does not need to perform step S1 and step S2. The process of step S3 and the subsequent steps is performed on the basis of a first predicted amount of power demand and a second predicted amount of power demand that are externally supplied.

Incidentally, such a process of issuing demands and giving points is continued for a predetermined period (for one month, for example). Then, the number of points after the passage of the predetermined period is determined as points obtained by the consumer in the predetermined period.

The power management according to the embodiment of the present technology can encourage the consumer to reduce or increase the amount of power demand temporarily. It is thereby possible to adjust the amount of power demand temporarily, and benefit the power retailer. This is because when power is procured in advance by spot trading and power is insufficient on the designated day, power needs to be procured in real time at a comparatively high price. In addition, a waste of electricity can be decreased by reducing the amount of power demand.

A demand is executed in a form of the turning off of an electric device, the issuance of a coupon, the notification of an event, or the like, and a concrete value of power or the like is not presented to the consumer. The consumer can therefore meet the demand easily. However, this does not exclude the presentation of a power value in notifying the demand.

In addition, encouraging the consumer to go out by issuing a coupon or notifying an event, for example, can reduce power and provide advertisements for other businesses. It is also possible to contribute to an increased business in association with another business. The power management by demands according to the embodiment of the present technology is performed as described above.

In addition, by giving points to a consumer who has executed a demand, an incentive to execute demands actively can be given to consumers. Further, an incentive to execute demands can be given to consumers also by determining consumers who can obtain points by executing a demand on a first-come, first-served basis.

2. Examples of Modification

One embodiment of the present technology has been concretely described above. However, the present technology is not limited to the foregoing embodiment, but is susceptible of various kinds of modifications based on technical ideas of the present technology.

The embodiment has been described supposing that power demand prediction and the calculation of a differential amount of power are performed for each consumer. However, in power trading, the power retailer usually adds together predicted amounts of power demand of a plurality of consumers under contract and procures power for the plurality of consumers by one time of power trading. Accordingly, the power management by demands similarly bundles the plurality of consumers under contract and performs power demand prediction and the calculation of a differential amount of power. Then, the differential amount of power may be allocated to each consumer, and demands may be determined for each consumer.

The embodiment has been described supposing that demands are issued when there is a differential amount of power. However, demands may be issued only when the differential amount of power is compared with a predetermined threshold value and the differential amount of power is equal to or more than the predetermined threshold value. This prevents demands from being issued when there is an insignificant differential amount of power, and thus prevents demands from being issued frequently and annoying consumers.

The embodiment has been described supposing that the second power demand prediction is performed on the day preceding the trading object day. However, for example, spot trading may be performed on the day preceding the trading object day, the second power demand prediction may be performed on the next day, that is, the designated trading object day, and power management on the designated trading object day may be performed by issuing demands.

The embodiment has been described supposing that points are given at a time of acceptance of a demand and that the points are determined when action is actually taken according to the demand. However, the method of giving points is not limited only to the above. For example, the points may not be given at a time of acceptance, but the points may be given and determined when the consumer has actually taken action in response to the demand.

The present technology can also adopt the following constitutions.

(1) A power management device including:

a power demand predicting section configured to calculate a first predicted amount of power demand, the first predicted amount of power demand representing a result of prediction of power demand of a power consumer on a date and time in a future, and a second predicted amount of power demand, the second predicted amount of power demand being calculated after the first predicted amount of power demand, and represent a result of prediction of power demand of the power consumer on the date and time in the future;

a demand control section configured to determine a demand for prompting the power consumer to adjust the amount of power demand on a basis of the first predicted amount of power demand and the second predicted amount of power demand;

a demand issuing section configured to issue the demand determined by the demand control section to the power consumer; and an acceptance receiving section configured to receive acceptance of the issued demand by the power consumer.

(2) The power management device according to the above (1), wherein the demand issuing section issues demands to a plurality of power consumers, and the acceptance receiving section ends reception of acceptances at a point in time that the amount of power demand adjusted by demands accepted by power consumers reaches a difference between the first predicted amount of power demand and the second predicted amount of power demand.

(3) The power management device according to the above (1) or (2), further including a point control section configured to increase or decrease points of the power consumer according to whether the power consumer has executed the demand.

(4) The power management device according to the above (3), wherein the point control section adds points to the points of the power consumer when the power consumer has executed the demand.

(5) The power management device according to the above (3) or (4), wherein the point control section gives points to the power consumer when the power consumer has accepted the demand issued by the demand issuing section, and when the power consumer has executed the demand, the point control section adds the points given to the power consumer by retaining the points.

(6) The power management device according to any of the above (3) to (5), wherein the point control section subtracts points from the points of the power consumer when the power consumer has not executed the demand.

(7) The power management device according to any of the above (3) to (6), wherein the point control section gives points to the power consumer when the power consumer has accepted the demand issued by the demand issuing section, and when the power consumer has not executed the demand that the power consumer accepted, the point control section subtracts the points.

(8) The power management device according to any of (3) to (7), wherein when the power consumer has not executed the demand, the point control section subtracts more points than the points given to the power consumer.

(9) The power management device according to any of the above (3) to (8),
wherein the point control section increases or decreases the points of the power consumer indicating the acceptance before an end of reception of the acceptance.

(10) The power management device according to any of the above (1) to (9),
wherein the demand control section determines a plurality of demands as demands to be issued.

(11) A power management method including:
calculating a first predicted amount of power demand, the first predicted amount of power demand representing a result of prediction of power demand of a power consumer on a date and time in a future, and a second predicted amount of power demand, the second predicted amount of power demand being calculated after the first predicted amount of power demand, and representing a result of prediction of power demand of the power consumer on the date and time in the future;
determining a demand for prompting the power consumer to adjust the amount of power demand on a basis of the first predicted amount of power demand and the second predicted amount of power demand;
issuing the determined demand to the power consumer; and
receiving acceptance of the issued demand by the power consumer.

(12) A demand notifying device including:
a communicating section configured to receive a demand transmitted from a power management device;
the power management device having
a power demand predicting section configured to calculate a first predicted amount of power demand, the first predicted amount of power demand representing a result of prediction of power demand of a power consumer on a date and time in a future, and a second predicted amount of power demand, the second predicted amount of power demand being calculated after the first predicted amount of power demand, and represent a result of prediction of power demand of the power consumer on the date and time in the future,
a demand control section configured to determine a demand for prompting the power consumer to adjust the amount of power demand on a basis of the first predicted amount of power demand and the second predicted amount of power demand,
a demand issuing section configured to issue the demand determined by the demand control section to the power consumer, and
an acceptance receiving section configured to receive acceptance of the issued demand by the power consumer; and
a notifying section configured to notify the demand to the power consumer.

(13) A power management device including:
a demand control section configured to determine a demand for prompting a power consumer to adjust an amount of power demand on a basis of a first predicted amount of power demand, the first predicted amount of power demand representing a result of prediction of power demand of a power consumer on a date and time in a future, and a second predicted amount of power demand, the second predicted amount of power demand being calculated after the first predicted amount of power demand, and represent a result of prediction of power demand of the power consumer on the date and time in the future;
a demand issuing section configured to issue the demand determined by the demand control section to the power consumer; and
an acceptance receiving section configured to receive acceptance of the issued demand by the power consumer.

(14) A power management method including:
determining a demand for prompting a power consumer to adjust an amount of power demand on a basis of a first predicted amount of power demand, the first predicted amount of power demand representing a result of prediction of power demand of a power consumer on a date and time in a future, and a second predicted amount of power demand, the second predicted amount of power demand being calculated after the first predicted amount of power demand, and representing a result of prediction of power demand of the power consumer on the date and time in the future;
issuing the determined demand to the power consumer; and
receiving acceptance of the issued demand by the power consumer.

(15) A demand notifying device including:
a communicating section configured to receive a demand transmitted from a power management device;
the power management device having
a demand control section configured to determine a demand for prompting a power consumer to adjust an amount of power demand on a basis of a first predicted amount of power demand, the first predicted amount of power demand representing a result of prediction of power demand of a power consumer on a date and time in a future, and a second predicted amount of power demand, the second predicted amount of power demand being calculated after the first predicted amount of power demand, and represent a result of prediction of power demand of the power consumer on the date and time in the future;
a demand issuing section configured to issue the demand determined by the demand control section to the power consumer; and
an acceptance receiving section configured to receive acceptance of the issued demand by the power consumer; and
a notifying section configured to notify the demand to the power consumer.

The present disclosure contains subject matter related to that disclosed in Japanese Priority Patent Application JP 2011-246793 filed in the Japan Patent Office on Nov. 10, 2011, the entire content of which is hereby incorporated by reference.

What is claimed is:

1. A power management device comprising:
one or more processors configured to:
calculate a first predicted amount of power demand, the first predicted amount of power demand representing a result of prediction of power demand of a plurality of power consumers on a future date and time;
calculate a second predicted amount of power demand, the second predicted amount of power demand being calculated after the first predicted amount of power demand, and representing a result of prediction of power demand of the plurality of power consumers on the future date and time;
determine a demand for prompting the plurality of power consumers to adjust an amount of power demand based on the first predicted amount of power demand and the second predicted amount of power demand;
issue the determined demand to the plurality of power consumers; and receive acceptances of the issued demand from the plurality of power consumers, wherein the one or more processors are configured to end the reception of the acceptances at a point in time that the amount of power demand adjusted by the issued demands accepted by the plurality of power consumers reaches a difference between the first predicted amount of power demand and the second predicted amount of power demand.

2. The power management device according to claim 1, wherein the one or more processors are further configured to increase or decrease points of the plurality of power consumers according to whether the plurality of power consumers has executed the issued demand.

3. The power management device according to claim 2, wherein the one or more processors are further configured to add points to the points of the plurality of power consumers when the plurality of power consumers has executed the issued demand.

4. The power management device according to claim 3,
wherein the one or more processors are further configured
to assign the points to the plurality of power consumers when the plurality of power consumers has accepted the issued demand, and
when the plurality of power consumers has executed the issued demand, the one or more processors are configured to add the points assigned to the plurality of power consumers by retaining the points.

5. The power management device according to claim 2, wherein the one or more processors are further configured to subtract points from the points of the plurality of power consumers when the plurality of power consumers has not executed the issued demand.

6. The power management device according to claim 5,
wherein the one or more processors are further configured
to assign points to the plurality of power consumers when the plurality of power consumers has accepted the issued demand, and
when the plurality of power consumers has not executed the issued demand that the plurality of power consumers accepted, the one or more processors are configured to subtract the points.

7. The power management device according to claim 6, wherein, when the plurality of power consumers has not executed the demand, the one or more processors are configured to subtract more points than the points given to the plurality of power consumers.

8. The power management device according to claim 2, wherein the one or more processors are further configured to increase or decrease the points of the plurality of power consumers indicating the acceptance before an end of reception of the acceptance.

9. The power management device according to claim 1, wherein the one or more processors are further configured to determine a plurality of demands as demands to be issued.

10. A power management method comprising:
calculating a first predicted amount of power demand, the first predicted amount of power demand representing a result of prediction of power demand of a plurality of power consumers on a future date and time;
calculating a second predicted amount of power demand, the second predicted amount of power demand being calculated after the first predicted amount of power demand, and representing a result of prediction of power demand of the plurality of power consumers on the future date and time;
determining a demand for prompting the plurality of power consumers to adjust an amount of power demand based on the first predicted amount of power demand and the second predicted amount of power demand;
issuing the determined demand to the plurality of power consumers; and
receiving acceptance of the issued demand from the plurality of power consumers, wherein the reception of the acceptance ends at a point in time that the amount of power demand adjusted by issued demands accepted by the plurality of power consumers reaches a difference between the first predicted amount of power demand and the second predicted amount of power demand.

11. A demand notifying device comprising:
a communicating section configured to receive a demand transmitted from a power management device;
the power management device including one or more processors configured to:
calculate a first predicted amount of power demand, the first predicted amount of power demand representing a result of prediction of power demand of a power consumer on a future date and time;
calculate a second predicted amount of power demand, the second predicted amount of power demand being calculated after the first predicted amount of power demand, and representing a result of prediction of power demand of the power consumer on the future date and time;
determine a demand for prompting the power consumer to adjust an amount of power demand based on the first predicted amount of power demand and the second predicted amount of power demand;
issue the determined demand to the power consumer;
receive acceptance of the issued demand by the power consumer;
notify the issued demand to the power consumer;
increase or decrease points of the power consumer based on an execution of the issued demand by the power consumer; and
subtract points of the power consumer when the power consumer has not executed the issued demand.

12. A power management device comprising:
one or more processors configured to:
determine a demand for prompting a plurality of power consumers to adjust an amount of power demand based on a first predicted amount of power demand, the first predicted amount of power demand representing a result of prediction of power demand of the plurality of power consumers on a future date and time;
calculate a second predicted amount of power demand, the second predicted amount of power demand being calculated after the first predicted amount of power demand, and representing a result of prediction of power demand of the plurality of power consumers on the future date and time;
issue a demand to the plurality of power consumers; and
receive acceptance of the issued demand from the plurality of power consumers, wherein the one or more processors are configured to end the reception of the acceptances at a point in time that the amount of power demand adjusted by the issued demands accepted by the plurality of power consumers reaches a difference between the first predicted amount of power demand and the second predicted amount of power demand.

13. A power management method comprising:
determining a demand for prompting a power consumer to adjust an amount of power demand based on a first predicted amount of power demand, the first predicted amount of power demand representing a result of prediction of power demand of the power consumer on a future date and time, and a second predicted amount of power demand, the second predicted amount of power demand being calculated after the first predicted amount of power demand, and representing a result of the prediction of power demand of the power consumer on the future date and time;

issuing the determined demand to the power consumer;

receiving acceptance of the issued demand from the power consumer;

increasing or decreasing points of the power consumer based on an execution of the issued demand by the power consumer; and subtracting points of the power consumer in an event the power consumer has not executed the issued demand.

14. A demand notifying device comprising:

a communicating section configured to receive a demand transmitted from a power management device;

the power management device including
one or more processors configured to:

determine a demand for prompting a power consumer to adjust an amount of power demand based on a first predicted amount of power demand, the first predicted amount of power demand representing a result of prediction of power demand of the power consumer on a future date and time, and a second predicted amount of power demand, the second predicted amount of power demand being calculated after the first predicted amount of power demand, and representing a result of prediction of power demand of the power consumer on the future date and time;

issue the determined demand to the power consumer;

receive acceptance of the issued demand from the power consumer;

notify the demand to the power consumer;

increase or decrease points of the power consumer based on an execution of the issued demand by the power consumer; and subtract points of the power consumer in an event the power consumer has not executed the issued demand.

* * * * *